United States Patent
Vietze et al.

(12)

(10) Patent No.: US 11,618,220 B2
(45) Date of Patent: Apr. 4, 2023

(54) PART FOR CONNECTION TO AT LEAST ONE FURTHER PART, METHOD FOR CONNECTING A PART TO AT LEAST ONE FURTHER PART, AND COMPOSITE PART

(71) Applicant: TELSONIC HOLDING AG, Bronschhofen (CH)

(72) Inventors: Axel Vietze, Frauenfeld (CH); Peter Solenthaler, St. Margarethen (CH)

(73) Assignee: Telsonic Holding AG, Bronschhofen (CH)

( * ) Notice: Subject to any disclaimer, the term of this patent is extended or adjusted under 35 U.S.C. 154(b) by 767 days.

(21) Appl. No.: 16/494,918

(22) PCT Filed: Feb. 22, 2018

(86) PCT No.: PCT/EP2018/054380
§ 371 (c)(1),
(2) Date: Sep. 17, 2019

(87) PCT Pub. No.: WO2018/172014
PCT Pub. Date: Sep. 27, 2018

(65) Prior Publication Data
US 2020/0139637 A1    May 7, 2020

(30) Foreign Application Priority Data
Mar. 24, 2017  (WO) ................. PCT/EP2017/057081

(51) Int. Cl.
*B29C 65/08* (2006.01)
*B29C 65/00* (2006.01)
(Continued)

(52) U.S. Cl.
CPC ............ *B29C 65/082* (2013.01); *B23K 20/10* (2013.01); *B29C 66/004* (2013.01);
(Continued)

(58) Field of Classification Search
None
See application file for complete search history.

(56) References Cited

U.S. PATENT DOCUMENTS

| 3,893,223 A | 7/1975 | Mims |
| 9,475,232 B2 | 10/2016 | Melack et al. |

FOREIGN PATENT DOCUMENTS

| CN | 102009475 A | 4/2011 |
| DE | 10 2014 226 955 A1 | 6/2016 |

(Continued)

OTHER PUBLICATIONS

Chinese Office Action Corresponding to 201880020199.0 dated Feb. 20, 2021.

(Continued)

*Primary Examiner* — Daniel J. Schleis
(74) *Attorney, Agent, or Firm* — Finch & Maloney PLLC (57) ABSTRACT

Parts (10) for connection to at least one further part (30, 30'). The part (10) has at least two weld sections (11, 11') to be welded individually to at least one of the further parts (30, 30') by vibration welding. Each weld section (11, 11') has at least one weld surface (13, 13'), for connection to the corresponding further part (30, 30'), and is spatially separated from each other weld section (11, 11') by at least one vibration decoupling zone (14, 14', 23, 26). The part (10) has a particular arrangement of the weld section (11, 11') with respect to the center of gravity (S) or has a particular mass distribution with respect to the weld section (11, 11'). Methods for connecting a part to at least one further part (30, 30') and a composite part (90) containing a part (10) and a further part (30, 30') are also disclosed.

21 Claims, 5 Drawing Sheets

(51) Int. Cl.
*B23K 20/10* (2006.01)
*B29L 31/30* (2006.01)
*B23K 101/00* (2006.01)
*B32B 3/26* (2006.01)
*B60R 19/02* (2006.01)

(52) U.S. Cl.
CPC .... *B29C 66/1122* (2013.01); *B29C 66/53245* (2013.01); *B29C 66/61* (2013.01); *B29C 66/81431* (2013.01); *B29C 66/8322* (2013.01); *B23K 2101/006* (2018.08); *B29C 66/20* (2013.01); *B29L 2031/3005* (2013.01); *B29L 2031/3041* (2013.01); *B29L 2031/3044* (2013.01); *B29L 2031/3058* (2013.01); *B32B 3/266* (2013.01); *B60R 19/02* (2013.01)

(56) References Cited

FOREIGN PATENT DOCUMENTS

| EP | 2 246 178 A1 | 11/2010 | |
|---|---|---|---|
| TW | 201628748 A | 8/2016 | |
| WO | 2015/164623 A1 | 10/2015 | |
| WO | WO-2015164623 A1 * | 10/2015 | ........... B23K 20/106 |

OTHER PUBLICATIONS

International Search Report Corresponding to PCT/EP2018/054380 dated May 16, 2018.
Written Opinion Corresponding to PCT/EP2018/054380 dated May 16, 2018.

* cited by examiner

PART FOR CONNECTION TO AT LEAST ONE FURTHER PART, METHOD FOR CONNECTING A PART TO AT LEAST ONE FURTHER PART, AND COMPOSITE PART

The present invention relates to structural elements for connecting to at least one further structural element, to methods for connecting structural elements to at least one further structural element, and to composite parts.

It is known to connect structural elements by means of linear or torsional ultrasonic welding, or by means of vibration welding. Thus, for example, DE 10 2014 226 955 Al discloses the connection of a mount-on part to a structural element by means of ultrasound. The mount-on part has a weld portion, to be welded to the structural element, which has a contact surface for contact with a torsion sonotrode, and has an opposite weld surface for connection to the structural element. In order to limit the ultrasonic vibrations insofar as possible to the weld portion, the weld portion is surrounded, at least portionally, by an outer vibration decoupling zone and delimited, at least portionally, by a ring-shaped, inner vibration decoupling zone.

In the case of many structural elements having large masses and/or asymmetrical structure, however, there is the risk of other portions of the structural element becoming damaged because of the introduction of vibrations (especially in the case of ultrasonic vibrations) into the weld portion. In particular, it is imperative that this be avoided if vibration-sensitive components such as, for example, electronic components are present. Moreover, particularly in the case of large structural elements, a considerable proportion of the vibration energy can be diverted out of the weld portion, and is then no longer available for the actual welding. This can result in an insufficient weld strength.

It is an object of the present invention to overcome the stated disadvantages of the prior art. In particular, the risk of damage to the structural element resulting from the introduced vibrations is to be reduced, or even completely eliminated. Furthermore, it is intended that structural elements having comparatively large masses, and asymmetrical structural elements, can be connected in a reliable manner.

In a first aspect of the invention, this object is achieved by a structural element for connecting to at least one further structural element. The structural element has at least two weld portions, which are to be welded individually to at least one of the further structural elements by means of vibratory welding. Here and in the following vibratory welding is understood to mean a process in which welding is effected by means of vibrations. The vibratory welding may be an ultrasonic welding such as, for example, a linear ultrasonic welding or a torsional ultrasonic welding. Alternatively, the vibratory welding may also be vibration welding. Each of the weld portions has a respective weld surface for connecting to the respective further structural element. This includes both the possibility that each weld portion is connected to one and the same further structural element, and the possibility that a first weld portion is connected to a first further structural element, and a second weld portion is connected to a second further structural element. In addition, according to the invention each weld portion is spatially separated from each other weld portion by at least one vibration decoupling zone.

The vibration decoupling zone has the effect that it is only to the least possible extent that vibration energy that is introduced into one of the weld portions is transferred to the other weld portions and is thus no longer available for the actual welding. Since, according to the first aspect, there are at least two portions to be welded individually, the application spectrum is expanded considerably. Thus, even large and heavy structural elements can be connected to further structural elements at a plurality of connection points. In the case of sequential welding, the risk of damaging an already previously produced first connection during welding of a second connection is reduced.

Preferably, each weld portion is not only spatially separated from each other weld portion by a vibration decoupling zone, but each weld portion is spatially separated from all of the rest of the structural element by at least one vibration decoupling zone. Consequently, the diverting-out of vibration energy, not only to the other weld portions, but to all of the rest of the structural element, is prevented.

In a second aspect of the invention, the structural element for connecting to at least one further structural element likewise has at least one weld portion to be welded to the further structural element by means of vibratory welding. The weld portion has a weld surface for connecting to the further structural element. The weld portion is spatially separated from the rest of the structural element by at least one vibration decoupling zone.

According to the second aspect, the mid-point of the weld portion has a (positive) distance from the centroid of the structural element, in a projection perpendicular to the weld surface. The mid-point of the weld portion in this case is understood to mean, in particular, the centroid of the weld portion. This centroid need not necessarily lie within the weld portion—for example if the weld portion is realized in the form of a ring.

In other words, in a projection perpendicular to the weld surface, the mid-point of the weld portion coincides with the centroid of the structural element. Despite this asymmetry, the vibration decoupling zone is effective in preventing vibration energy from being deflected out of the weld portion, such that the advantages already mentioned above can be achieved. In particular, the situation is avoided whereby the asymmetry of the structural element causes uncontrollable vibration conditions that could result in damage to the structural element.

The said distance may be at least 1%, preferably at least 2%, and particularly at least 5% of the radius of the structural element measured with respect to the mid-point of the weld portion. The radius of the structural element measured with respect to the mid-point of the weld portion is understood to mean the greatest distance of all points of the structural element from the mid-point of the weld portion. Despite such an asymmetry, the vibration decoupling zone is effective in preventing vibration energy from being diverted out of the weld portion.

A third aspect of the invention likewise relates to a structural element for connecting to at least one further structural element, wherein the structural element has at least one weld portion to be welded to the further structural element by means of vibratory welding, and the weld portion has a weld surface for connecting to the further structural element. In the case of the third aspect also, the weld portion is spatially separated from the rest of the structural element by at least one vibration decoupling zone.

In a first variant of the third aspect, the moment of inertia of the region of the structural element that is enclosed by the vibration decoupling zone, said moment of inertia being determined with respect to an axis running through the mid-point of the weld portion and perpendicularly in relation to the weld surface, is at most 50%, preferably at most 40%, particularly preferably at most 30% of the moment of inertia of the structural element as a whole, measured with respect to the said axis. The vibratory welding in this case is preferably torsional vibratory welding.

In a second variant of the third aspect, the mass of the region of the structural element that is enclosed by the vibration decoupling zone is at most 50%, preferably at most 40%, particularly preferably at most 30% of the mass of the structural element as a whole. In this second variant, the vibratory welding is, in particular, linear vibratory welding.

Thus, in other words, only a comparatively small proportion of the moment of inertia, or of the mass, is enclosed by the vibration decoupling zone. The vibration decoupling zone has the effect, however, that an excessive proportion of the vibration energy is not deflected off into the remaining larger and decoupled region of the structural element, such that a large proportion of the vibration energy is available for the actual welding, and the mass decoupled by means of the vibration decoupling zone is not, or is only slightly, affected by vibrations.

In many embodiments, the region enclosed by the vibration decoupling zone forms an inner region, and the region decoupled by means of the vibration decoupling zone forms an outer region—for example if the weld region is circular and the vibration decoupling zone is arranged around it in the form of a ring. However, it is also conceivable, and within the scope of the invention, for the weld region to be in the form of a ring, and the vibration decoupling zone likewise to be in the form of a ring and arranged within the weld region; in this case, within the scope of the present invention, the enclosed region forms an outer region, and the decoupled region forms an inner region. Likewise, it is within the scope of the invention that—as in DE 10 2014 226 955 A1—the weld portion is surrounded, at least portionally, by an outer vibration decoupling zone and is delimited, at least portionally by a ring-shaped inner vibration decoupling zone; the enclosed region is then in the form of a ring, and the decoupled region is composed of an inner region and an outer, ring-shaped region.

In a fourth aspect, the invention relates to a structural element for connecting to at least one further structural element, wherein, here also, the structural element has at least one weld portion to be welded to the further structural element by means of vibratory welding, and the weld portion has a weld surface for connecting to the further structural element.

In the fourth aspect, the weld portion is spatially separated from the rest of the structural element by at least one vibration decoupling zone, in such a manner that, upon vibrational excitation of the structural element in the weld portion, the proportion of the time-averaged vibration energy of the decoupled region of the structural element that is located outside of the vibration decoupling zone to the time-averaged vibration energy of the structural element as a whole is reduced because of the vibration decoupling zone, specifically from more than 50%, preferably more than 60%, particularly preferably more than 70%, to less than 30%, preferably less than 20%, particularly preferably less than 10%.

In other words, a given structural element according to the invention is compared with a hypothetical comparison structural element that corresponds substantially to the structural element according to the invention, but that does not have a vibration decoupling zone. The comparison structural element is excited to vibrate in the weld portion, vibrations occurring in an enclosed region (which corresponds to the region located inside the vibration decoupling zone of the structural element according to the invention) and in a decoupled region (which corresponds to the region of the structural element according to the invention located outside of the vibration decoupling zone), said vibrations having, respectively, a time-averaged enclosed and decoupled vibration energy. The structural element according to the invention, having a vibration decoupling zone, in the case of equal vibrational excitation in the weld portion, also has a time-averaged vibration energy in the decoupled region. According to the fourth aspect of the invention, in the case of the comparison structural element the time-averaged vibration energy in the decoupled region is more than 50% (particularly preferably more than 60%, and particularly preferably more than 70%) of the time-averaged vibration energy of the structural element as a whole. In the case of the structural element according to the invention, having a vibration decoupling zone, owing to the vibration decoupling zone this proportion is reduced to less than 30%, (preferably less than 20%, and particularly preferably less than 10%).

In this fourth aspect, also, the vibration decoupling zone prevents vibration energy from the deflected out of the enclosed region.

The said reduction of the proportion of the time-averaged vibration energy may occur, in particular, if the vibrational excitation is effected at a frequency that lies in the range of from 10 kHz to 50 kHz, preferably in the range of from 20 kHz to 40 kHz, and particularly preferably is approximately 20 kHz; these are typical ultrasonic frequencies. Alternatively or additionally, the said reduction may occur if the vibrational excitation is effected at a frequency that lies in the range of from 150 Hz to 250 Hz, and preferably is approximately 200 Hz; these are the frequencies typically used in vibration welding.

The following disclosure of further preferred embodiments relates to all four aspects according to the invention explained above.

The weld portion, in particular each weld portion, may have a respective contact surface for contact with a resonator. Vibrations can be introduced into the structural element via this contact surface. The resonator may be a sonotrode, such as, for example, a torsion sonotrode.

At least one of the vibration decoupling zones may include, or be formed by, a spring structure, by means of which vibrations that are introduced into a weld portion are prevented, at least partly, from propagating into a second portion, in particular in a second weld portion, of the structural element. The vibrations may be introduced into the contact surface either directly, via the resonator, thus for example via the sonotrode, or indirectly, via the further structural element.

The spring structure may be a geometrically springing structure, which includes, or is formed by, for example at least one bead. Such a geometrically spring structure can be produced comparatively easily. If there are a plurality of beads, they may be realized, for example, in a linear manner and arranged parallel to each other, or they may be realized in the form of a circle or ellipse and arranged concentrically. Alternatively, clearly, many other forms and arrangement of the beads are conceivable, and within the scope of the invention, insofar as they effect vibration decoupling.

Alternatively or additionally, at least one of the vibration decoupling zones may be formed by at least one decoupling opening and/or at least one thinned region of material. A decoupling opening extends fully through the structural element, while a thinned region of material does not extend fully through the structural element. The individual decoupling openings and thinned regions of material may be, for example, round, semicircular, oval, elliptical, crescent-shaped, or triangular or polygonal, having points or round corners, or may also be of any other shape composed of concave and/or convex bent shapes, without or in combination with straight segments. If there are a plurality of decoupling openings and/or thinned regions of material, they may be arranged, for example, parallel to or concentrically with each other.

It is likewise conceivable, and within the scope of the invention, for at least one of the vibration decoupling zones to be composed of a material different from that of a least a part of the rest of the structural element. For example, at least one of the vibration decoupling zones may be composed of a material whose modulus of elasticity is less than the modulus of elasticity of the material of at least a part of the rest of the structural element. It is thereby possible for the deflection of vibration energy out of the weld portion to be prevented, or at least reduced. Structural elements whose vibration decoupling zone is composed of a material different from that of at least a part of the rest of the structural element may be produced, for example, by multi-component injection molding, in particular two-component injection molding, or by multi-component extrusion, in particular two-component extrusion.

At least one weld portion may surround an inner vibration decoupling zone, at least portionally, as is disclosed, for example, in DE 10 2014 226 955 Al. The inner vibration decoupling zone may surround, at least portionally, an inner structural element portion that has a through-hole. Furthermore, at least one weld portion may be surrounded, at least portionally, by an outer vibration decoupling zone. The weld surface of at least one of the weld portions may be formed by at least one rib extending from the weld portion. In respect of these details, reference is made to the above-mentioned patent application DE 10 2014 226 955 Al, the disclosure of which relating thereto being herewith incorporated into the present application.

The weld portion, in particular each weld portion, may have, on a first side of the structural element, a first weld surface for connecting to a first further structural element and, on a second side of the structural element, have a second weld surface for connecting to a second further structural element. In this way, the structural element that includes the vibration decoupling zone can be welded between two further structural elements, without it being necessary for these two further structural elements themselves to have vibration decoupling zones.

The structural element and/or the further structural element may be composed, for example, of a plastic or of a metal.

The weld surface may have a diameter in the region of from 20 mm to 40 mm.

The centroid of the structural element may lie outside of the weld surface, or even outside of the weld portion that includes the weld surface. Even then, the vibration decoupling zone prevents excessive deflection of vibration energy out of the weld portion, and uncontrollable vibration conditions.

The structural element is preferably a structural element for a motor vehicle, in particular an external or internal facing part of a motor vehicle. This may be a bumper, side panel, spoiler, decor part, blanking plug, trim, sill, brake cooling means, headlamp cleaning unit, or fastening means for fastening a functional part, for example a sensor, in particular a distance sensor. It is also conceivable that the structural element is a structural element for fastening a passive component, in particular a decor part, blanking plug or trim.

Furthermore, the present invention also includes a method for connecting a structural element, as disclosed above, to at least one further structural element, wherein the weld portion of the structural element, in particular each weld portion of the structural element, and/or a weld region of the further structural element has a contact surface for contact to a resonator. As already explained above, the resonator may be a sonotrode, such as, for instance, a torsion sonotrode. A contact surface may thus be present only on the structural element according to the invention, having a vibration decoupling zone, or only on the further structural element, which need not necessarily have a vibration decoupling zone, or both on the structural element and on the further structural element.

The method includes the following steps:
a) bringing the weld surface of the structural element into contact with a weld region of the further structural element,
b) exerting a force upon the contact surface by means of a resonator, in particular a sonotrode, in particular a torsion sonotrode, such that the weld surface and the weld region are pressed against each other, and
c) introducing a vibration, in particular an ultrasonic vibration, by means of the resonator, such that the weld surface becomes welded to the weld region.

The advantages already described above ensue in the execution of this method.

The structural element may be a structural element according to the second aspect of the invention, In this case, it is particularly advantageous if, in step c), there is introduced a torsional vibration, in particular a torsional ultrasonic vibration, with respect to a torsion axis that runs through the mid-point of the weld portion or at a distance of not more than 20 mm, preferably not more than 10 mm, particularly preferably not more than 5 mm therefrom.

Alternatively, in the case of a structural element according to the second aspect of the invention, a linear vibration, in particular a linear ultrasonic vibration, is also introduced in step c), wherein the perpendicular projection of the mid-point of the weld portion onto the contact surface lies in the mid-point of a weld surface of the resonator or at a distance of not more than 20 mm, preferably not more than 10 mm, particularly preferably not more than 5 mm therefrom. The linear vibration and the torsional vibration are effected, in particular, in a plane parallel to the weld surface.

The resonator may have an axis of symmetry that may coincide, for example, with the torsion axis of a torsional resonator. This axis of symmetry may run through the mid-point of the weld portion or at a distance of not more than 20 mm, preferably not more than 10 mm, particularly preferably not more than 5 mm therefrom.

The resonator may introduce a vibration at a frequency at which the time-averaged vibration energy of the decoupled region of the structural element that is located outside of the vibration decoupling zone is reduced because of the vibration decoupling zone, specifically from more than 50%, preferably more than 60%, particularly preferably more than 70%, to less than 30%, preferably less than 20%, particularly preferably less than 10%. The advantages already stated above are thereby likewise obtained.

The invention also includes a further, independent method for connecting a structural element to at least one further structural element. In the case of this method, the structural element has weld portion to be welded to the further structural element by means of vibratory welding. The weld portion has a weld surface for connecting to the further structural element, and the weld portion of the structural element, in particular each weld portion of the structural element, and/or a weld region of the further structural element has a contact surface for contact with a resonator, which may be, for example, a sonotrode, such as, for instance, a torsion sonotrode.

The second, independent method according to the invention includes the following steps:
a) bringing the weld surface of the structural element into contact with a weld region of the further structural element,
b) exerting a force upon the contact surface by means of a resonator, such that the weld surface and the weld region are pressed against each other, and
c) introducing a vibration, in particular an ultrasonic vibration, by means of the resonator, such that the weld surface becomes welded to the weld region.

In this second method according to the invention, the vibration decoupling zone of the structural element is arranged, in at least one direction, at a distance from the contact surface that is less than one eighth of the wavelength of the resonator in the region of the weld surface. In this second method according to the invention, also, owing to the vibration decoupling zone, less vibration energy is diverted out of the weld portion. The said direction may run, for example, perpendicularly in relation to the contact surface and/or to the weld surface. Preferably, the wavelength of the resonator is in the range of from 20 mm to 35 mm.

The further structural element (which need not necessarily have a vibration decoupling zone) or the structural element according to the invention, having a vibration decoupling zone, may be a structural element for a motor vehicle, in particular an external or internal facing part of a motor vehicle, for example a bumper, side panel, spoiler, decor part, blanking plug, trim, sill, brake cooling means or headlamp cleaning unit. The structural element according to the invention, having a vibration decoupling zone, or the further structural element (which need not necessarily have a vibration decoupling zone) may be a fastening means for fastening a functional part, for example a sensor, in particular a distance sensor. In particular the method according to the invention may thus be used, for example, to weld a holder for a distance sensor to a bumper, with only the holder, or only the bumper, or both, having a vibration decoupling zone. However, the structural element according to the invention, having a vibration decoupling zone, or the further structural element (which need not necessarily have a vibration decoupling zone) may also be a fastening means for fastening a passive component, in particular a decor part, blanking plug or trim.

In a final aspect, the invention also relates to a composite part, which includes a structural element according to the invention and a further structural element. The weld surface of the structural element is welded to a weld region of the further structural element, in particular by means of ultrasonic welding, preferably torsional ultrasonic welding. In particular, the composite part may be produced in a method according to the invention. For example, the further structural element or the structural element may be a structural element for a motor vehicle, in particular an external or internal facing part of a motor vehicle, for example a bumper, side panel, spoiler, decor part, blanking plug, trim, sill, brake cooling means or headlamp cleaning unit, and/or the structural element or the further structural element may be a fastening means for fastening a functional part, for example a sensor, in particular a distance sensor, or a passive structural element, as described above. A composite part connected by means of torsional ultrasonic welding can be recognized because of a particularly smooth surface structure in the region of the weld, and can be distinguished from a composite part connected by means of linear ultrasonic welding.

The invention is explained in the following on the basis of a plurality of exemplary embodiments. There are shown

Figure 1A:
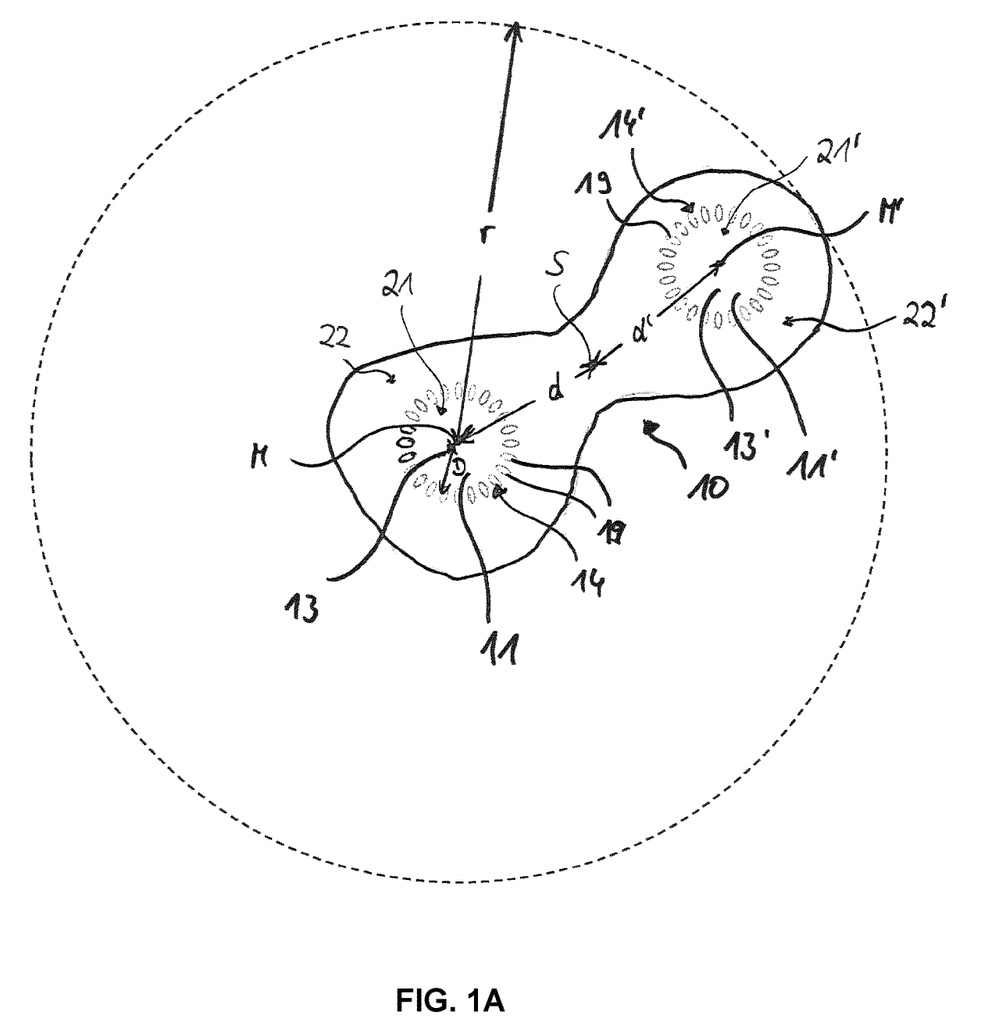
FIG. 1a: a top view of a structural element according to the invention, having two weld portions.
Figure 1B:
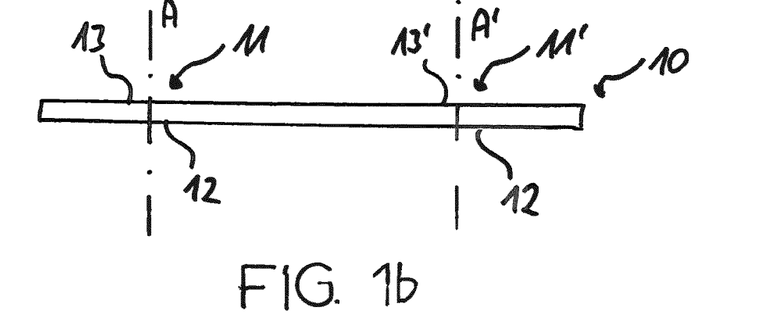
FIG. 1b: a side view of the first structural element according to the invention.
Figure 1C:
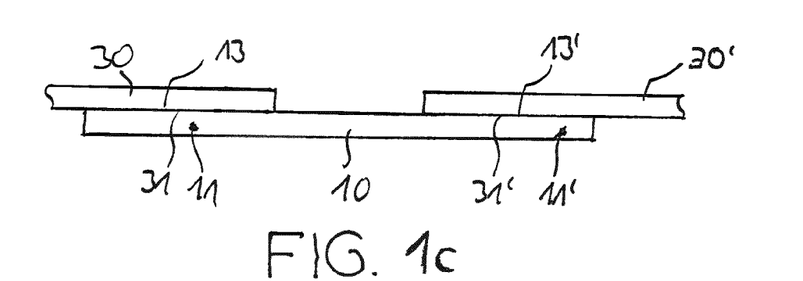
FIG. 1c: a side view of the first structural element according to the invention, having two further structural elements welded thereto.

Represented in FIGS. 1a to 1c is a first structural element 10 according to the invention for connecting to two further structural elements 30. The structural element 10 may be composed of a plastic or a metal. The structural element 10 includes two weld portions 11, 11', which are to be welded to a respective further structural element 30, 30', for example by means of torsional ultrasonic welding. Each of the weld portions 11, 11' has a respective weld surface 13, 13' for connecting to the respective further structural element 30, 30'. The weld surfaces 13, 13' have a diameter D, which may be in the range of from 20 mm to 40 mm.

In addition, both weld portions 11, 11' have a respective contact surface 12, 12' for contact with a resonator, by means of which ultrasonic vibrations can be introduced. The resonator may be, for example, a torsion sonotrode.

Both weld portions 11, 11' are spatially separated from the rest of the structural element 10, thus in particular from the respectively other weld portion 11, 11', by a respective vibration decoupling zone 14, 14'. The weld portions 11, 11' each have a mid-point M, M', which coincides with the respective centroid of the weld portion 11, 11'. Both vibration decoupling zones 14, 14' are formed by a multiplicity of decoupling openings 19, 19', which extend fully through the structural element 10, have an oval shape and are arranged in the form of a circle around the mid-point M of the weld portion 11. Instead of decoupling openings 19, it would also be possible to provide merely thinned regions of material that do not extend fully through the structural element 10.

In a projection perpendicular to the weld surface 13 (i.e. in the plane of the drawing of FIG. 1a), the mid-points M, M' of the weld portions 11, 11' have a respective distance d, d' from the centroid S of the structural element 10 as a whole. The distance d is more than 5% of the radius r of the structural element 10, measured with respect to the mid-point M of the weld portion 11. In this case, the radius r as above is understood to mean the greatest distance of all points of the structural element 10 from the mid-point M of the weld portion 11. Analogously, the distance d' is more than 5% of the radius of the structural element 10, measured with respect to the mid-point M' of the weld portion 11'. In the exemplary embodiment shown here, the centroid S of the structural element 10 also lies outside of both weld portions 11, 11'.

The structural element 10 as a whole has a moment of inertia with respect to an axis A that runs through the mid-point M of the weld portion 11 and perpendicularly in relation to the weld surface 13. With respect to the same axis A, the enclosed region 21 lying within the vibration decoupling zone 14 also has a moment of inertia that is less than 30% of the moment of inertia of the structural element 10 as a whole. Analogously, with respect to an axis A', the enclosed region 21' lying with the vibration decoupling zone 14' has a moment of inertia that is less than 30% of the moment of inertia of the structural element 10 as a whole.

Moreover, the mass of the enclosed region 21 lying within the vibration decoupling zone 14 is less than 30% of the mass of the structural element 10 as a whole, and also the mass of the enclosed region 21' lying within the vibration decoupling zone 14' is less than 30% of the mass of the structural element 10 as a whole.

Owing to the vibration decoupling zone 14, upon vibrational excitation of the structural element 10 in the weld portion 11, the proportion of the time-averaged vibration energy of the decoupled region 22 of the structural element 10 that is located outside of the vibration decoupling zone 14 to the time-averaged vibration energy of the structural element 10 as a whole is reduced from more than 50% to less than 30%. Analogously, upon vibrational excitation of the structural element 10 in the weld portion 11', the proportion of the time-averaged vibration energy of the decoupled region 22' of the structural element 10 that is located outside of the vibration decoupling zone 14' to the time-averaged vibration energy of the structural element 10 as a whole is reduced from more than 50% to less than 30%. This applies, for example, in the case of a typical ultrasonic frequency of, for instance, 20 kHz. For use of vibration welding, the frequency could also be, for instance, 200 Hz.

Figure 2A:
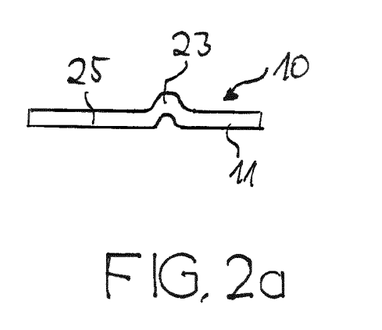
FIG. 2a: a side view of a second structural element according to the invention, having a bead.
Figure 2B:
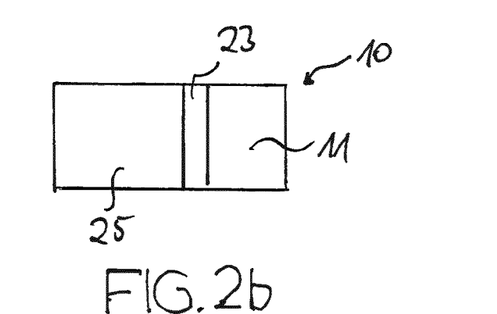
FIG. 2b a top view of the second structural element according to the invention.

The second structural element 10 according to the invention, shown in FIG. 2, has only a single vibration decoupling zone 23, which is realized as a bead 23. The bead 23 forms a geometrically spring structure and, at least partly, prevents vibrations in one weld portion 11 from propagating into a second portion 25 of the structural element 10.

Figure 3A:
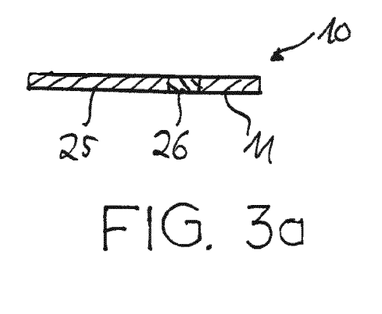
FIG. 3a: a side sectional view of a third structural element according to the invention, of two materials having differing moduli of elasticity.
Figure 3B:
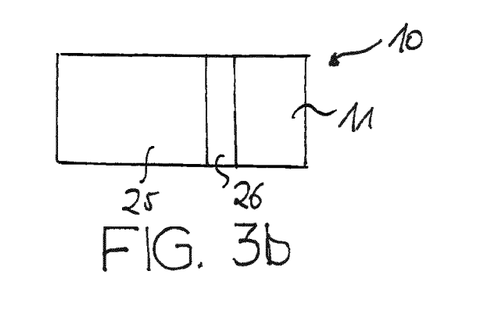
FIG. 3b: a top view of the third structural element according to the invention.

In the third exemplary embodiment according to FIGS. 3a and 3b, the structural element 10 includes a vibration decoupling zone 26 composed of a material different from that of the rest of the structural element. Specifically, the modulus of elasticity of the vibration decoupling zone 26 is less than the modulus of elasticity of the rest of the structural element 10. Such a structural element 10 may be produced, for example, by two-component injection molding or by two-component extrusion.

Figure 4:
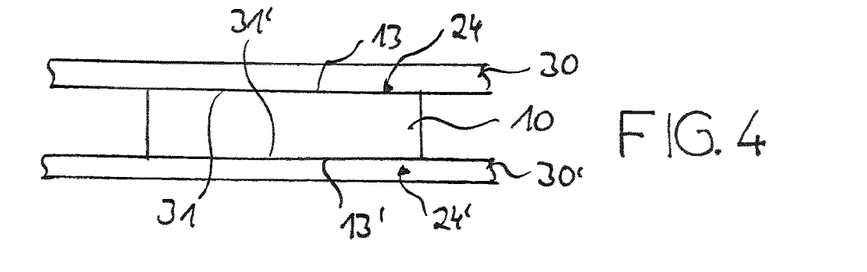
FIG. 4: a side view of a fourth structural element according to the invention, which on both sides is welded to a further structural element.

FIG. 4 shows a further structural element 10 according to the invention, having a first weld surface 13, arranged on a first side 24, for connecting to a first further structural element 30, and having a second weld surface 13', arranged on a second side 24' of the structural element 10, for connecting to a second further structural element 30', the vibration decoupling zones not being explicitly represented.

Figure 5:
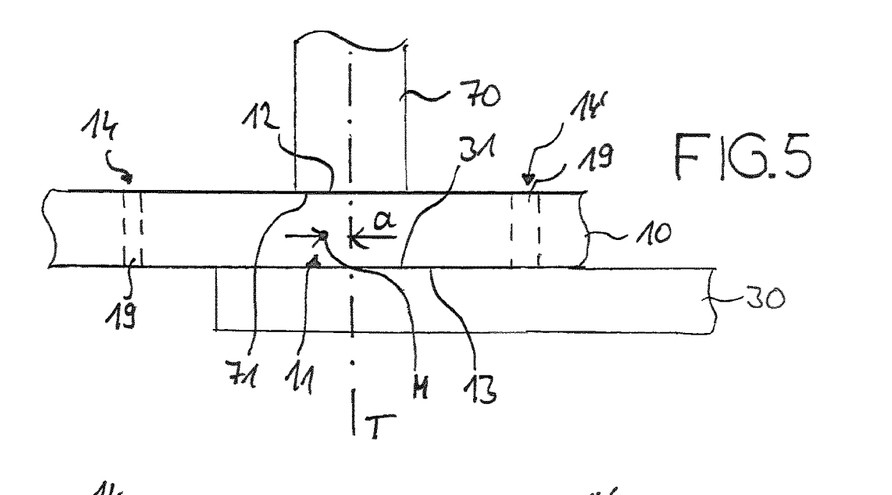
FIG. 5: a side view of a first method according to the invention, in which a structural element according to the invention has a contact surface for a torsional sonotrode.

Represented in FIG. 5 is a step of a method according to the invention for connecting a structural element 10 to a further structural element 30. Here, the structural element 10 includes both a weld portion 11 and a vibration decoupling zone 14, and a contact surface 12 for contact with a sonotrode 70. In this example, this is a torsion sonotrode 70, which can execute a torsional oscillation about a torsion axis T, and which has a weld surface 71. The weld surface 13 of the structural element 10 is brought into contact with a weld region 31 of the further structural element 30. A force is then exerted upon the contact surface 12 by means of the torsional sonotrode 70, such that the weld surface 13 and the weld region 31 are pressed against each other. An ultrasonic vibration is then introduced by means of the torsional sonotrode 70, such that the weld surface 13 becomes welded to the weld region 31. The torsion axis T in this case is at a distance a of not more than 20 mm from the mid-point M of the weld portion 11.

Figures 6, 7:
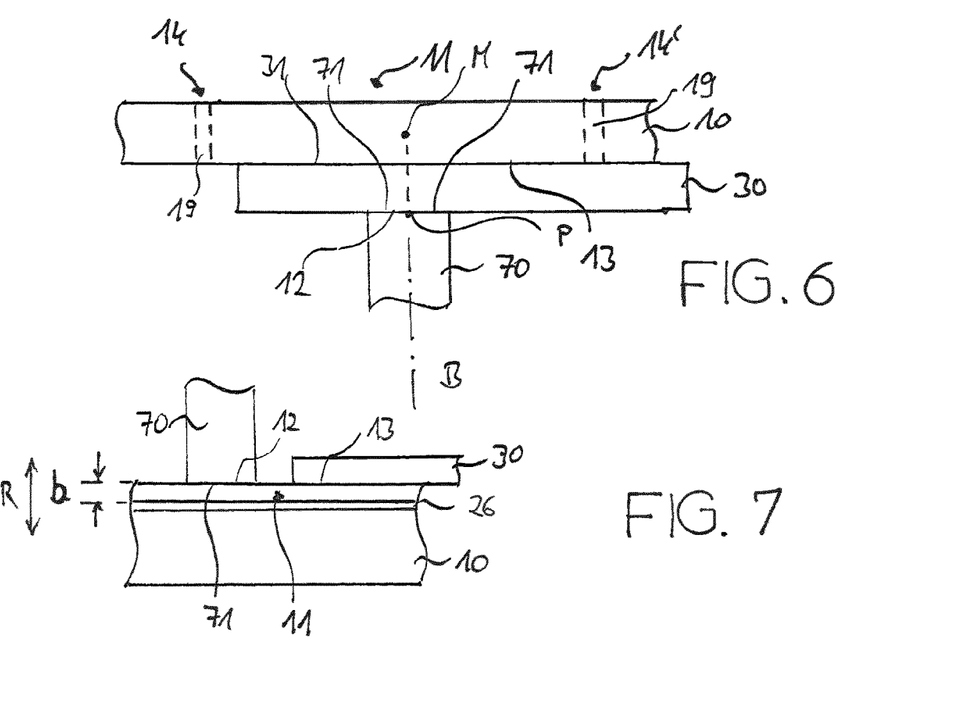
FIG. 6: a side view of a second method according to the invention, in which a further structural element has a contact surface for a linear sonotrode.
FIG. 7: a side view of a fifth structural element according to the invention.

Represented in FIG. 6 is a variant in which it is not the structural element 10 according to the invention, but the further structural element 30 that includes a contact surface 12 for a resonator 70. In a further difference, the resonator 70 here is a linear sonotrode 70, by means of which a linear ultrasonic vibration is introduced. The linear sonotrode 70 has a weld surface 71 having a mid-point P. The linear ultrasonic vibration may be effected parallel or perpendicularly to the contact surface 12. The perpendicular projection of the mid-point M of the weld portion 13 onto the contact surface 12 lies in the mid-point P of this weld surface 71. It is also conceivable, however, for the said perpendicular projection to lie at a distance from the mid-point P, which distance is not more than 20 mm.

The linear sonotrode 70 has an axis of symmetry B, which runs through the mid-point of the weld surface 71. The structural element 10 and the sonotrode 70 are each matched to one another in such a manner that vibrations can be introduced at a frequency at which the time-averaged vibration energy of the decoupled region 22 of the structural element 10 that is located outside of the vibration decoupling zone 14 is reduced, because of the vibration decoupling zone 14, from more than 50% to less than 30%.

A further method according to the invention is represented in FIG. 7. In a direction R, which is perpendicular to the contact surface 12 and to the weld surface 13 of the structural element 10, the vibration decoupling zone 26, of a different material, is arranged at a distance b from the contact surface 12, which distance is less than one eighth of the wavelength of the sonotrode 70 in the region of the weld surface 13. The wavelength in this case may lie in the range of from 20 mm to 35 mm.

The further structural element 30 or the structural element 10 may be an external or internal facing part of a motor vehicle, for example a bumper, side panel, spoiler, sill, brake cooling means or headlamp cleaning unit. The structural element 10 or the further structural element 30 may be a fastening means for fastening a functional part, for example a distance sensor.

Figure 8:
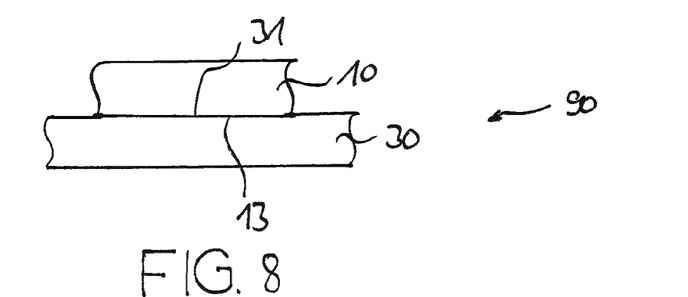
FIG. 8: a side view of a composite part according to the invention.

FIG. 8 shows an example of a composite part 90 produced, by means of the method according to the invention, from a structural element 10 according to the invention and a further structural element 30.

Figure 9:
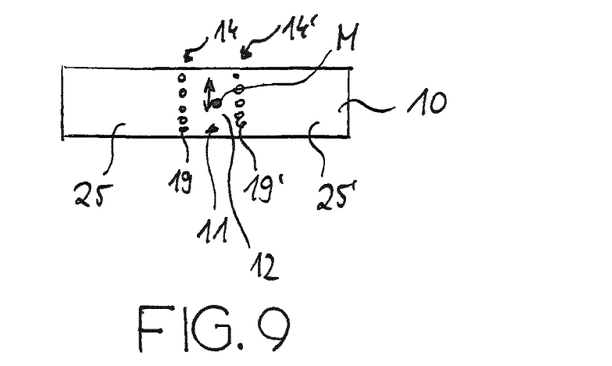
FIG. 9: a side view of a sixth structural element according to the invention.

Represented in FIG. 9 is a further, rectangular structural element 10 according to the invention, in which a centered weld portion 11 is spatially separated from two second portions 25, 25' by two vibration decoupling zones 14, 14'. Here, the vibration decoupling zones 14, 14' are each formed by a series of decoupling openings 19. A linear ultrasonic vibration can be introduced into the contact surface 12, in the direction represented by a double arrow. The mass of the enclosed region located between the vibration decoupling zones 14, 14' is less than 30% of the mass of the structural element 10 as a whole.

Figure 10:
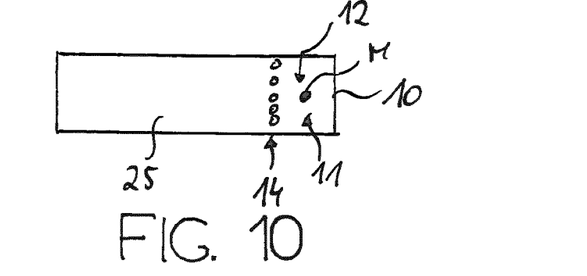
FIG. 10: a side view of a seventh structural element according to the invention.

The likewise rectangular structural element 10 according to the invention that is shown in FIG. 10 has a weld portion 11 that, in this case, however, is not centered. A linear ultrasonic vibration can be introduced into the contact surface 12, in the direction represented by a double arrow. The mass of the region located to the right of the vibration decoupling zone 14 in the figure is less than 30% of the mass of the structural element 10 as a whole.

Figure 11:
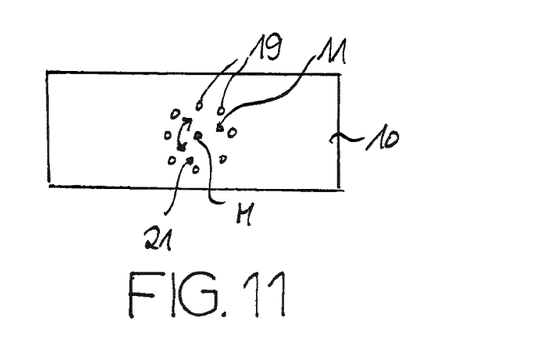
FIG. 11: a side view of an eighth structural element according to the invention.

In the case of the structural element 10 according to the invention shown in FIG. 11, the weld portion 11 is centered, but in this case a torsional ultrasonic vibration, indicated by a curved double arrow, is to be introduced. With respect to an axis that runs through the mid-point M of the weld portion 11, the enclosed region 21 located inside the vibration decoupling zone 14 has a moment of inertia that is less than 30% of the moment of inertia of the structural element 10 as a whole with respect to this axis.

Figure 12:
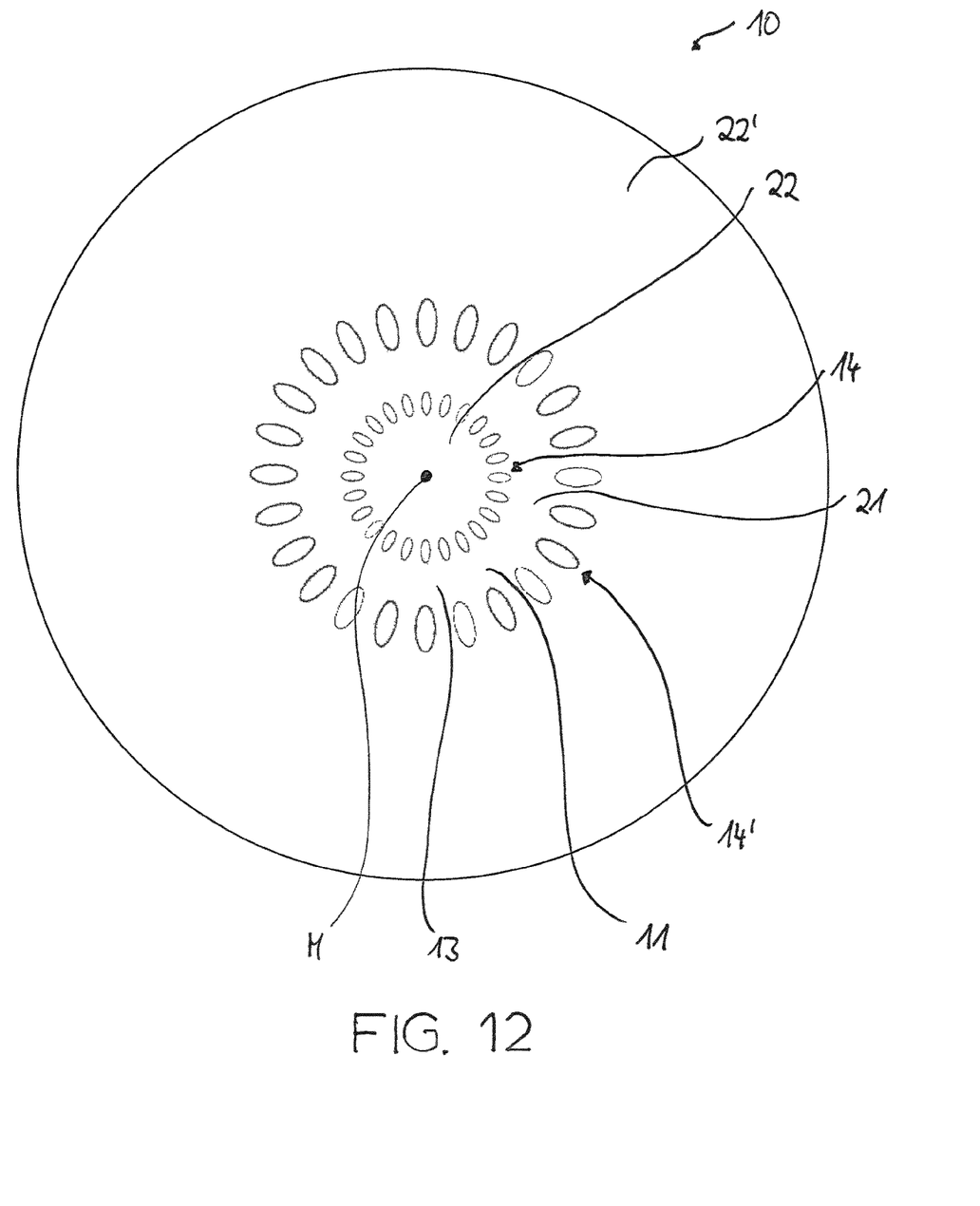
FIG. 12: a top view of a ninth structural element according to the invention.

In FIG. 12, the structural element 10 has a ring-shaped weld portion 11, which surrounds an inner ring-shaped vibration decoupling zone 14, and which itself is surrounded by an outer ring-shaped vibration decoupling zone 14'. Here, the region 21 enclosed by the vibration decoupling zones 14, 14' is ring-shaped. The decoupled region is composed of region 22 located inside the inner vibration decoupling zone 14, and of a ring-shaped region 22' located outside of the vibration decoupling zone 14'. The mid-point M of the weld portion, i.e. its centroid, itself is not located in the weld portion 11, but in the region 22. The moment of inertia of the region enclosed by the vibration decoupling zone 14, said moment of inertia being determined with respect to an axis A running through the mid-point M and perpendicularly in relation to the weld surface 13, is less than 30% of the moment of inertia of the structural element 10 as a whole, measured with respect to the said axis A.

The exemplary embodiments disclosed here reduce the proportion of the vibration energy deflected out of the weld portion, and thus provide for a more efficient utilization of the vibration energy, and reduce the risk of damage to the rest of the structural element.

The invention claimed is:

1. A structural element for connecting to at least one further structural element, wherein
   the structural element has at least two weld portions which are to be welded individually to at least one of the further structural elements by vibratory welding,
   each weld portion has a respective weld surface for connecting to the respective further structural element, and
   each weld portion is spatially separated from each other weld portion by at least one vibration decoupling zone for reducing the diversion of vibration energy from one weld portion to another weld portion.

2. The structural element according to claim 1, wherein each weld portion is spatially separated from the rest of the structural element by at least one vibration decoupling zone.

3. A structural element for connecting to at least one further structural element, wherein
   the structural element has at least one weld portion to be welded to the further structural element by vibratory welding, and
   the weld portion has a weld surface for connecting to the further structural element,
   the weld portion is spatially separated from a rest of the structural element by at least one vibration decoupling zone for reducing the diversion of vibration energy from the weld portion to the rest of the structural element, and
   a mid-point of the weld portion has a distance from a centroid of the structural element, in a projection perpendicular to the weld surface.

4. The structural element according to claim 3, wherein the distance is at least 1% of the radius of the structural element measured with respect to the mid-point of the weld portion.

5. A structural element for connecting to at least one further structural element, wherein
   the structural element has at least one weld portion to be welded to the further structural element by vibratory welding and
   the weld portion has a weld surface for connecting to the further structural element,
   wherein the weld portion is spatially separated from a rest of the structural element by at least one vibration decoupling zone for reducing the diversion of vibration energy from the weld portion to the rest of the structural element, and
   a moment of inertia of the region of the structural element that is enclosed by the vibration decoupling zone, and said moment of inertia is determined with respect to an axis running through the mid-point of the weld portion and perpendicularly in relation to the weld surface is, at most, 50% of a moment of inertia of the structural element as a whole, measured with respect to said axis, and/or
   a mass of the region of the structural element that is enclosed within the vibration decoupling zone is at most 50% of a mass of the structural element as a whole.

6. A structural element for connecting to at least one further structural element, wherein
   the structural element has at least one weld portion to be welded to the further structural element by vibratory welding, and
   the weld portion has a weld surface for connecting to the further structural element,
   the weld portion is spatially separated from a rest of the structural element by at least one vibration decoupling zone in such a manner that, upon vibrational excitation of the structural element in the weld portion, a proportion of a time-averaged vibration energy of the decoupled region of the structural element that is located outside of the vibration decoupling zone to a time-averaged vibration energy of the structural element as a whole is reduced because of the vibration decoupling zone from more than 50% to less than 30%.

7. The structural element according to claim 1, wherein the weld portion has a respective contact surface for contact with a resonator.

8. The structural element according to claim 1, wherein at least one of the vibration decoupling zones includes or is formed by a spring structure by which vibrations that are introduced into a weld portion are, at least partly, prevented from propagating into a second portion of the structural element.

9. The structural element according to claim 8, wherein the spring structure is a geometrically spring structure.

10. The structural element according to claim 9, wherein the geometrically spring structure includes, or is formed by, at least one bead.

11. The structural element according to claim 1, wherein at least one of the vibration decoupling zones is formed by at least one decoupling opening and/or at least one thinned region of material.

12. The structural element according to claim 1, wherein at least one of the vibration decoupling zones is composed of a material different from that of a least a part of a rest of the structural element.

13. The structural element according to claim 12, wherein at least one of the vibration decoupling zones is composed of a material whose modulus of elasticity is less than a modulus of elasticity of the material of at least a part of the rest of the structural element.

14. The structural element according to claim 12, wherein the structural element is produced by multi-component injection molding or by multi-component extrusion.

15. The structural element according to claim 1, wherein the weld portion has a first weld surface, on a first side of the structural element, for connecting to a first further structural element and has a second weld surface, on a second side of the structural element, for connecting to a second further structural element.

16. The structural element according to claim 1, wherein the weld surface has a diameter in a range of from 20 mm to 40 mm.

17. The structural element according to claim 1, wherein the centroid of the structural element lies outside of the weld surface.

18. The structural element according to claim 1, wherein the structural element is a structural element for a motor vehicle.

19. The structural element according to claim 18, wherein the structural element is selected from the group consisting of a bumper, a side panel, a spoiler, a decor part, a blanking plug, trim, a sill, brake cooling means, a headlamp cleaning unit, fastening means for fastening a functional part and fastening means for fastening a passive component.

20. A composite part, including a structural element according to claim 1, and a further structural element,
wherein the weld surface is welded to a weld region of the further structural element.

21. The composite part according to claim 20,
wherein the further structural element or the structural element is a structural element for a motor vehicle.

* * * * *